United States Patent
Novoa et al.

(10) Patent No.: US 11,726,524 B2
(45) Date of Patent: Aug. 15, 2023

(54) SYSTEM AND METHOD FOR SEAMLESSLY TRANSITIONING A NETWORK CONNECTION VIA A WIRELESS DOCK

(71) Applicant: DELL PRODUCTS, LP, Round Rock, TX (US)

(72) Inventors: Manuel Novoa, Leander, TX (US); Daniel Lawrence Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 347 days.

(21) Appl. No.: 16/990,600

(22) Filed: Aug. 11, 2020

(65) Prior Publication Data

US 2022/0050502 A1 Feb. 17, 2022

(51) Int. Cl.
| | |
|---|---|
| G06F 1/16 | (2006.01) |
| H04W 76/11 | (2018.01) |
| H04L 49/20 | (2022.01) |
| H04W 88/08 | (2009.01) |
| H04W 12/50 | (2021.01) |

(52) U.S. Cl.
CPC ............ *G06F 1/1632* (2013.01); *H04L 49/20* (2013.01); *H04W 12/50* (2021.01); *H04W 76/11* (2018.02); *H04W 88/08* (2013.01)

(58) Field of Classification Search
CPC ......... H04W 4/80; H04W 4/021; H04W 4/02; H04W 4/029; H04W 12/122; H04W 4/40; H04W 4/30; H04W 4/33; H04W 84/12; H04W 4/023; H04W 4/21; H04W 64/00; H04W 88/02; H04W 76/14; H04W 52/0254; H04W 88/08; H04W 76/10; H04W 84/18; H04W 12/08; H04W 12/12; H04W 48/16; H04W 88/06
USPC ......................................................... 361/679
See application file for complete search history.

(56) References Cited

U.S. PATENT DOCUMENTS

| | | | |
|---|---|---|---|
| 9,377,814 B2 | 6/2016 | Ramirez et al. | |
| 2016/0212772 A1* | 7/2016 | Chen | ................... H04L 12/4641 |
| 2017/0324680 A1* | 11/2017 | Tu | ......................... H04L 69/321 |
| 2020/0084282 A1 | 3/2020 | Marquardt et al. | |

* cited by examiner

*Primary Examiner* — Ajibola A Akinyemi
(74) *Attorney, Agent, or Firm* — Larson Newman, LLP

(57) ABSTRACT

An information handling system includes a network interface card and a processor. The network interface card includes first and second virtual network interface cards. The processor communicates with the network interface card, and connects with an infrastructure access point via the first virtual network interface card. The processor forms multiple network connections via the infrastructure access point and the first virtual network interface card. The processor detects a wireless dock is within a predetermined proximity. In response to the wireless dock being within the predetermined proximity, the processor initiates a connection with the wireless dock via the second virtual network interface card. The processor resumes one or more of the network connections through the wireless dock via the second virtual network interface card. In response to the one or more of the network connections being resumed through the wireless dock, the processor drops the connection with the infrastructure access point.

20 Claims, 5 Drawing Sheets

SYSTEM AND METHOD FOR SEAMLESSLY TRANSITIONING A NETWORK CONNECTION VIA A WIRELESS DOCK

FIELD OF THE DISCLOSURE

The present disclosure generally relates to information handling systems, and more particularly relates to seamlessly transitioning a network connection via a wireless dock.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a network interface card and a processor. The network interface card includes first and second virtual network interface cards. The processor may communicate with the network interface card, and connect with an infrastructure access point via the first virtual network interface card. The processor further may form multiple network connections via the infrastructure access point and the first virtual network interface card. The processor may detect a wireless dock is within a predetermined proximity. In response to the wireless dock being within the predetermined proximity, the processor may initiate a connection with the wireless dock via the second virtual network interface card. The processor may resume one or more of the network connections through the wireless dock via the second virtual network interface card. In response to the one or more of the network connections being resumed through the wireless dock, the processor may drop the connection with the infrastructure access point.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
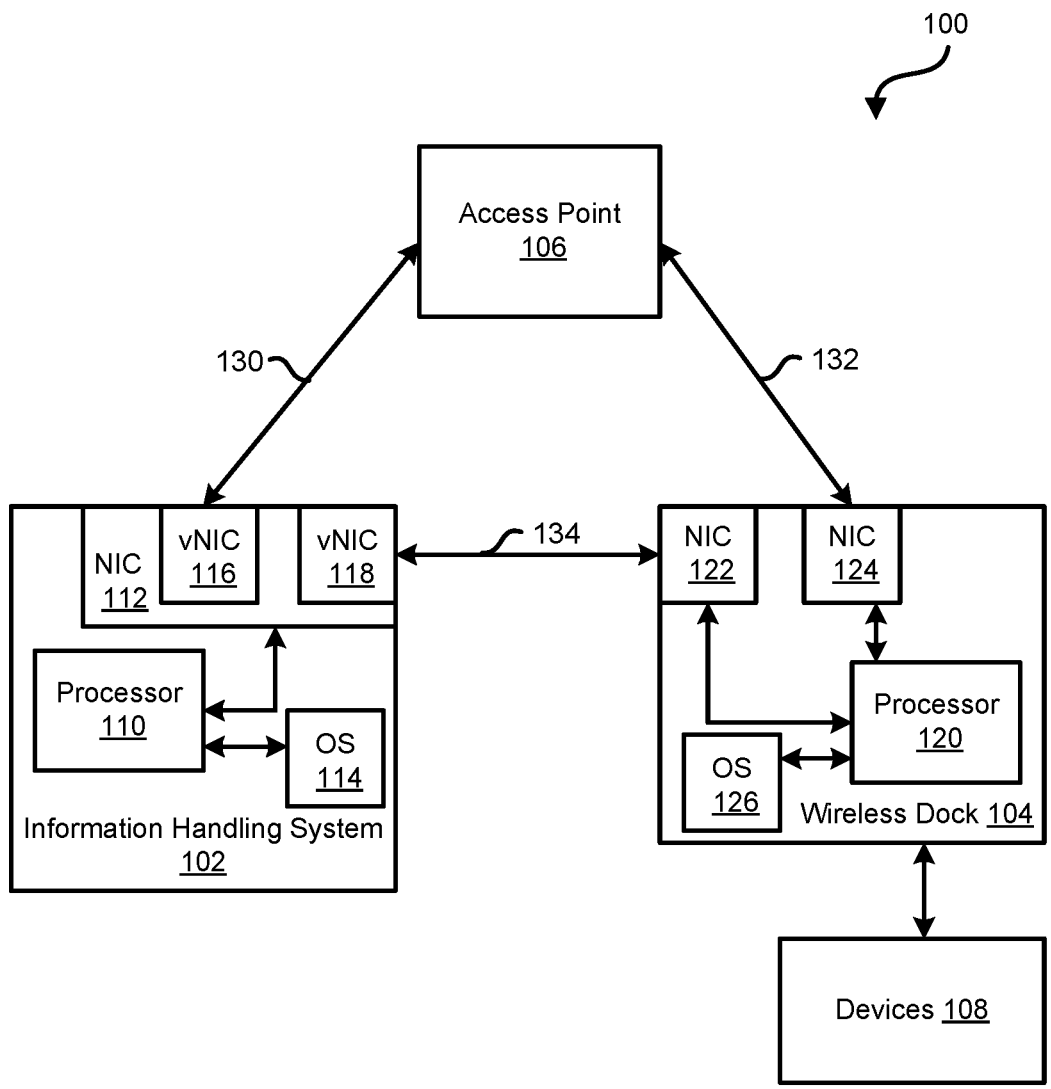
FIG. 1 is a block diagram of a portion of a system including one or more information handling systems according to at least one embodiment of the disclosure.

FIG. 1 shows a portion of a system 100 including an information handling system 102, a wireless dock 104, an access point (AP) 106, and one or more additional devices 108 according to at least one embodiment of the disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 102 a processor 110, a network interface card (NIC) 112, and an operating system (OS) 114. In an example, information handling system 102 can be a personal computer, such as a laptop computer, or the like. Information handling system 102 may include additional components over those shown in FIG. 2 without varying from the scope of this disclosure. Wireless dock 104 includes a processor 120, NICs 122 and 124, and an OS 126. In an example, wireless dock 104 may provide information handling system 102 with access to devices 108. In certain examples, devices 108 may include any suitable devices including, but not limited to, one or more monitors, storage devices, and printers. Wireless dock 104 may include additional components over those shown in FIG. 1 without varying from the scope of this disclosure. In certain examples, system 100 may include additional components over those shown in FIG. 1 without varying from the scope of this disclosure.

In certain examples, wireless dock 104 may provide one or more suitable connections for information handling system 102. For example, wireless dock 104 may provide outbound video data from information handling system 102 to device 108, such as a video monitor connected to the wireless dock. Additionally, wireless dock 104 may utilize a backhaul connection via wireless communication channel 132 to bridge information handling system 102 to infrastructure. In an example, wireless dock 104 may include a dual radio capability, such that the wireless dock may be able to communicate with both information handling system 102 and AP 106. For example, wireless dock 104 may utilize NIC 122 to communicate with information handling system 102 over one communication band, and may utilize NIC 124 to communicate with AP 106 over a different communication band.

During operation, information handling system 102 may connect to a wireless infrastructure via any suitable means. For example, information handling system 102 may utilize NIC 112 to connect a wireless communication channel 130 with AP 106. In an example, AP 106 may provide information handling system 102 with access to a network infrastructure, such as a wireless network for a business or home, and to additional data from websites of the Internet. Additionally, AP 106 may provide information handling system 102 with access to wireless dock 104 via wireless communication channel 132 between the AP and the wireless dock. In this example, wireless dock 104 may interface and communicate with AP 106 via NIC 124. In an example, wireless communication channels 130 and 132 may utilize any suitable communication band including, but not limited to, 2.4 GHz, 5 GHz, and 6 GHz.

In an example, information handling system 102 may connect with wireless dock 104 via AP 106 and communication channels 130 and 132. In an example, it may be important for information handling system 102 to maintain a constant low latency and high throughput wireless access. In certain examples, the connection between information handling system 102 and wireless dock 104 via AP 106 may be sufficient for low to medium bandwidth data requirements. The connection between handling system 102 and wireless dock 104 may be utilized to perform any suitable operation including, but not limited to, wirelessly display content and extending compute capabilities via an external co-processing elements. These operations by information handling system 102 may be dependent on shared network bandwidth on the inflight AP 106. However, performance of information handling system 102 may degrade rapidly depending on number of clients simultaneously connected to AP 106. For example, as traffic builds on the infrastructure connected to AP 106, an amount of bandwidth between information handling system 102 and wireless dock 104 may become limited through the AP. Thus, information handling system 102 may be improved by creating a dedicated direct connection between the information handling system and wireless dock 104 to improve the data communication between the information handling system and the wireless dock. This direct connection, such as communication channel 134, may minimize interference at AP 106 from other users and maximize available network bandwidth for information handling system 102.

In previous information handling systems, hardware for a targeted Wi-Fi adapter lacked throughput to simultaneously connect to multiple AP sources, such as AP 106 and wireless dock 104, to deliver sufficient bidirectional user experience without adverse effects. In an example, the adverse effects may be any possible effects including, but not limited to, dropping frames and significantly reduced network performance. In certain examples, a user of information handling system 102 may want to connect to multiples wireless docks. In these examples, a seamless network transition may include both a transition from AP 106 to wireless dock 104, and also a transition from the wireless dock to another wireless dock. Each wireless dock may have a unique service set identifier (SSID), which in turn may provide a route to a desired or specified information handling system network.

In the previous information handling systems, a user experience with an information handling system having direct attach devices and network transitions from APs, such as AP 106, may have any number of problems or issues. In an example, these problems or issues include, but are not limited to, the user of an information handling system being reliant existing information technology (IT) infrastructure from APs that severely restrict functionality of high network bandwidth applications, and an application continuity break when an information handling system switches to net new network SSID. For example, an operating system (OS) level network endpoint transition may forcibly terminate all network socket connections upon transition to a new AP source, but may maintain continuity only when the APs handle the infrastructure connection transition. Thus, information handling system 102 and wireless dock 104 may be improved by creating a seamless network transition from AP 106 to the wireless dock as described herein.

In an example, processor 110 may execute one or more applications of OS 114 to seamlessly transition from AP 106 to wireless dock 104. Information handling system 102 may be initially connected to AP 106, which in turn may provide communication between the information handling system and wireless dock 104. However, information handling system 102 may achieve lower latency and a higher throughput by creating a direct wireless connection with wireless dock 104 as compared to routing data through AP 106. In an example, processor 110 may achieve lower latency and a higher throughput by executing one or more software components, such a software service set, running on OS 114 to toggle between vNICs 116 and 118 while preserving continuity to open OS network connections and ports/threads. In certain examples, vNICs 116 and 118 may be virtual adapters or endpoints within NIC 112.

Processor 110 may perform one or more operations to discover one or more network APs adjacent to information handling system 102. For example, processor may filter the one or more network APs by network addressability by any suitable manner including, but not limited to, an addressability segment, and a virtual local area network. In an example, an adjacent AP may be an AP within wireless dock 104. Processor 110 may determine that wireless dock 104 is within a predetermined proximity. In certain examples, the predetermined proximity may be any suitable distance including, but not limited, a distance that is shorter than a current distance between information handling system 102 and AP 106. In an example, based on wireless dock 104 being with the predetermined proximity, information handling system 102 may maximize throughput and minimize latency of infrastructure connections via the wireless dock as compared to AP 106.

In response to wireless dock 104 being within the predetermined proximity of information handling system 102, processor 110 may perform one or more operations to determine whether an infrastructure connection of the wireless dock matches a pre-docked client infrastructure connection. In an example, the pre-docked client infrastructure for information handling system 102 may be provided via communication channel 130 between vNIC 116 and AP 106. Processor 110 may perform one or more operations of a dock discovery procedure, and then provide wireless dock 104 details about current infrastructure connections information handling system 102.

In response to receiving the details about the current infrastructure connections information handling system 102, processor 120 may perform one or more software services of OS 126 to determine whether wireless dock 104 may provide the infrastructure connections. For example, processor 120 may discover the infrastructure connections available on wireless dock 104 via a backhaul connection with AP 106 over communication channel 132. In an example, wireless dock 104 may determine that one or more of the current infrastructure connections of information handling system 102 are available via the backhaul connection. Wireless dock 104 may provide details about the one or more of the current infrastructure connections of information handling system 102 are available via the backhaul connection.

In response to receiving the details about the one or more of the current infrastructure connections of information handling system 102 are available via the backhaul connection, processor 110 may perform any suitable number of operations to determine whether the backhaul connection matches the pre-docked infrastructure with AP 106. For example, processor 110 may compare the connections available via wireless dock 104 to a threshold to determine whether a match is detected. In an example, the threshold may be any suitable threshold including, but not limited to, a percentage of connections available, and a total number of connections available. If the connections available via wireless dock 104 satisfy the threshold, processor 110 may validate the backhaul connection of the wireless dock.

Based on the backhaul connection of the wireless dock being validated, processor 110 may perform one or more operations to seamlessly transition the network connection of information handling system 102 from AP 106 to wireless dock 104. For example, processor 110 may disconnect from AP 106 and suspend all open infrastructure connections.

Information handling system 102 may perform one or more operations to perform a network transition from AP 106 to wireless dock 104. An exemplary operational flow of information handling system 102 transitioning between AP 106 and wireless dock 104 is described with respect to FIG. 2 below.

Figure 2:
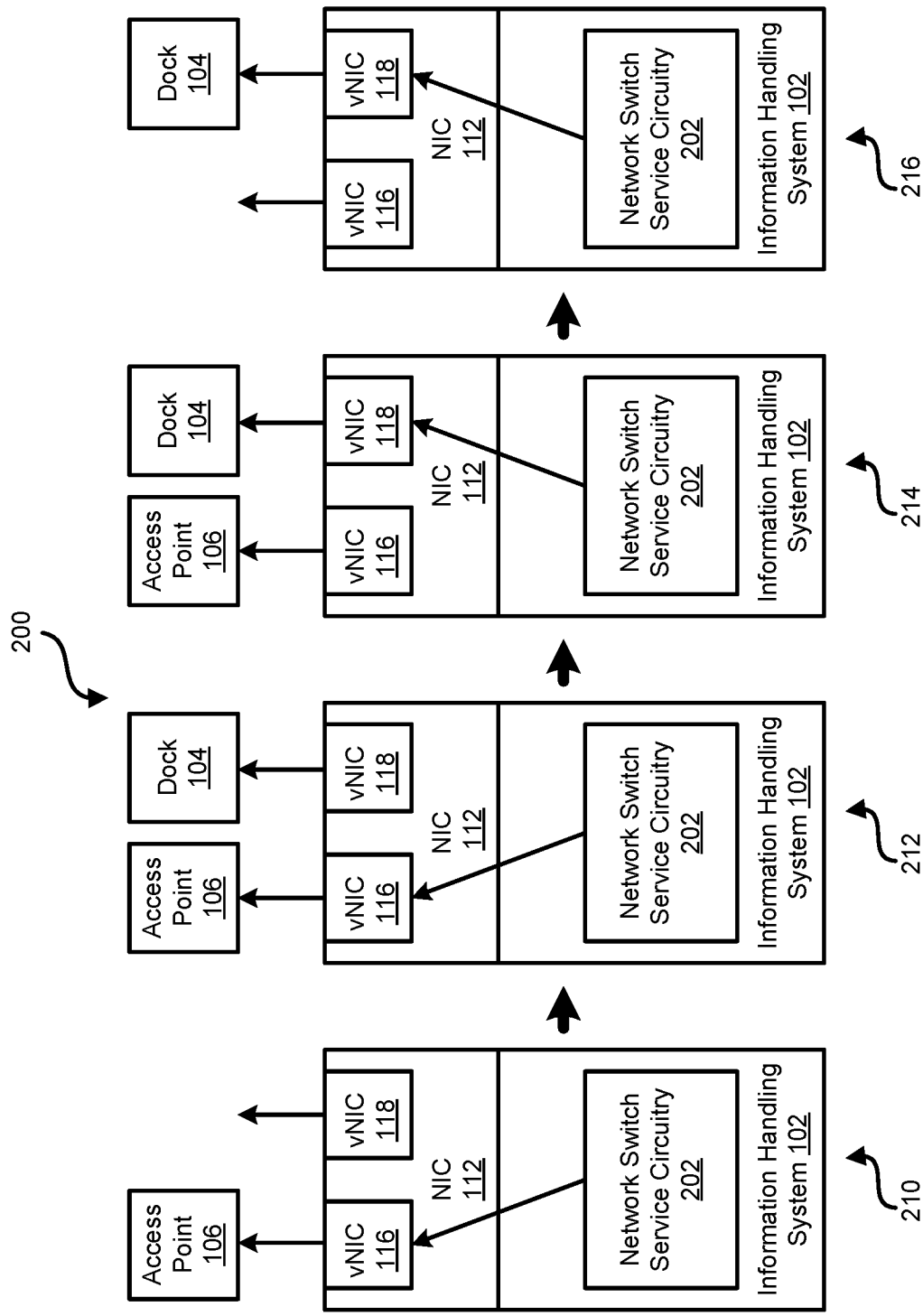
FIG. 2 is a block diagram illustrating an operational flow of an information handling system switching between access points according to at least one embodiment of the present disclosure.

FIG. 2 shows an operational flow 200 of information handling system 102 switching between access point 106 and wireless dock 104 according to at least one embodiment of the present disclosure. In an example, information handling system 102 may include any suitable device or component to control network connections including. For example, information handling system 100 may include a network switch service circuitry 202, which in turn may control NIC 112. In an example, network switch service circuitry 202 may be implemented or part of processor 110 of FIG. 1. Network switch service circuitry 202 may be any suitable component including, but not limited to, a traffic manager and application programming interface (API) on the information handling system 102. In an example, NIC 112 may include vNICs 116 and 118 to enable seamless network transitions by information handling system 106.

During a first connection stage 210, network switch service circuitry 202 may configure information handling system 102 to connect to AP 106 via vNIC 116 of NIC 112. In an example, while the first connection described herein is with AP 106, the first connection may be to a wireless dock without varying from the scope of this disclosure. Additionally, during first connection stage 210, vNIC 118 may not be connected any device, such as a null connection.

During a second connection stage 212, information handling system 102 may discover wireless dock 104. In response to wireless dock 104 being discovered, network switch service circuitry 202 may initiate a connection with wireless dock 118 via vNIC 118. In an example, the connection with wireless dock 118 may be performed by one or more operations known in the art. In certain examples, information handling system 102 may initiate the connection with wireless dock 104 when the information handling system is within a predetermined proximity to the wireless dock.

During a third connection stage 214, network switch service circuitry 202 may bind to vNIC 118. In response to binding with vNIC 118, network switch service circuitry 202 may resume all open network connections or ports on vNIC 118. In an example, the open network connections or ports may include the connections or ports that were open on vNIC 116 while information handling system 102 was connected to AP 106.

During a fourth connection stage 216, network switch service circuitry 202 may drop the connection between vNIC 116 and AP 106. In an example, this connection may be dropped based on the open network connections or ports being resumed on vNIC 118. Thus, the network transition from AP 106 to wireless dock 104 may be completed in a seamless manner, such that the current or open connections of information handling system 102 are not lost during the transition. After, the connection between vNIC 116 and AP 106 is dropped, the vNIC may be identified as having a null connection.

Referring back to FIG. 1, upon information handling system 102 seamlessly transitioning from AP 106 to wireless dock 104, the connection for open network processes within the information handling system while avoiding a network timeout. Additionally, information handling system 102 may communicate with the wireless dock via vNIC 118, wireless communication channel 134, and NIC 122. In an example, wireless dock 104 may maintain an infrastructure connection via wireless communication channel 132 between the wireless dock and AP 106.

During the seamless transition of information handling system 102 from AP 106 to wireless dock 104, processor 120 of wireless dock may perform one or more operations to enable the transition. For example, processor 120 may execute the services of OS 126 to bridge information handling system 102 to the backhaul connection between wireless dock 104 and AP 106. In an example, the bridging of information handling system 102 to the backhaul connection may be performed based on any suitable criteria to enforce authorization of a connection between the information handling system to wireless dock 104. For example, the criteria may include, but is not limited to a user policy, and an IT or administrator policy.

In an example, the transition of the network connection from AP 106 to wireless dock 104 may provide any suitable number of improvements to information handling system 102. For example, the seamless transition may avoid a network timeout for infrastructure connections of information handling system 102. Another improvement may include communication channel 134 providing a dedicated bandwidth to maximize display/render operations of information handling system 102, and USB device read/write performance of the information handling system from devices 108. Further improvements may include a low latency infrastructure connection maintained via the backhaul connection of wireless dock 104. In an example, the backhaul connection with AP 106 may be wired or wireless. Additionally, connection to wireless dock 104 may improve information handling system 102 by prioritizing network packets by class to prevent audio/video drops and preserve synchronization not possible via an independent connection to the infrastructure via AP 106.

While network switching in FIGS. 1 and 2 has been described with respect to switching between AP 106 and wireless dock 104, information handling system 102 may implement the operations described above to switch between two different wireless docks. For example, if information handling system 102 roams from one wireless dock to another, the information handling system may seamlessly transition between the wireless docks. In an example, each wireless dock may have a unique SSID to enable the seamless transition by information handling system 102.

Figure 3:
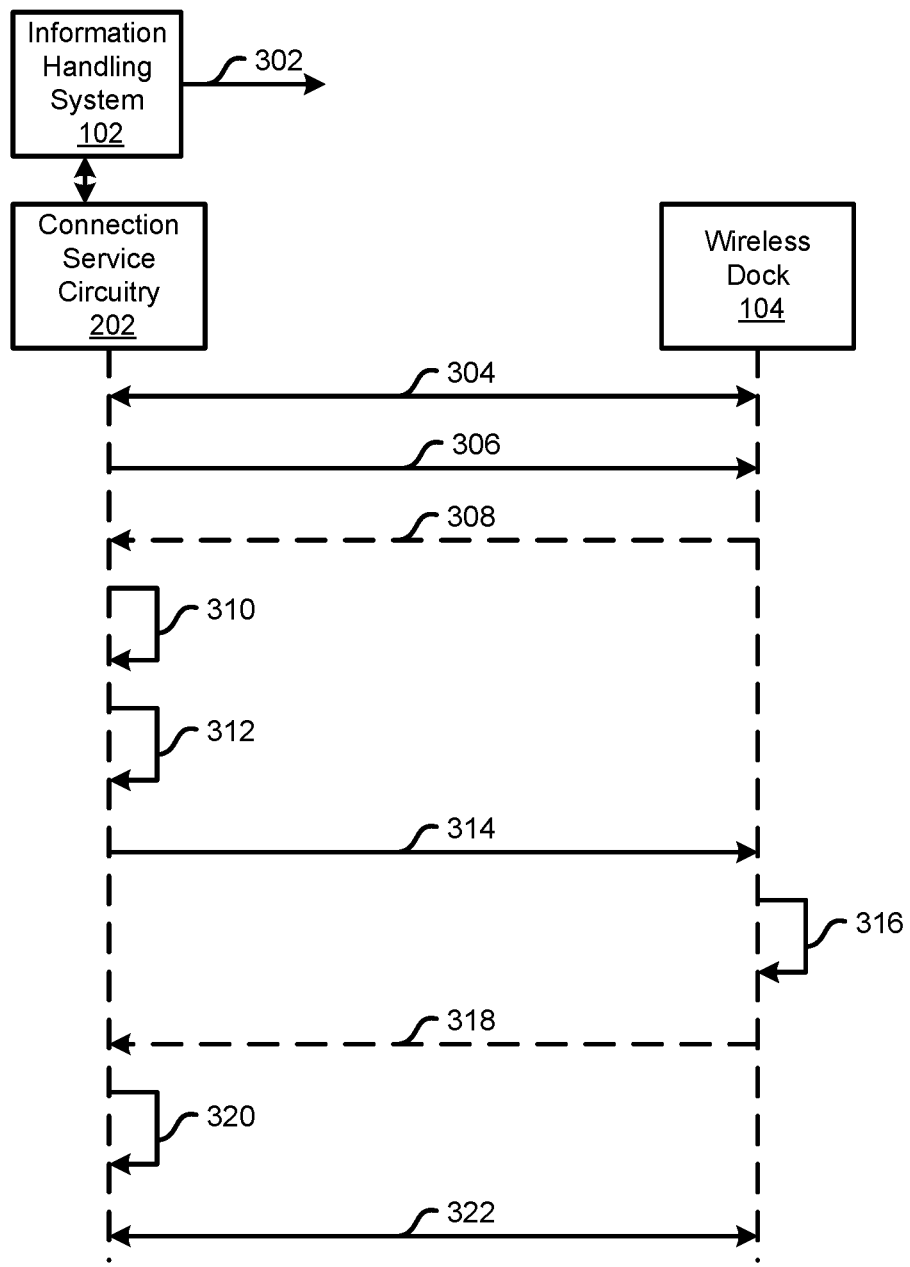
FIG. 3 is a diagram illustrating an operational flow for an information handling system to utilize a dock as an access point according to at least one embodiment of the present disclosure.

FIG. 3 is a diagram illustrating an operational flow 300 for information handling system 102 to utilize wireless dock 104 as an access point according to at least one embodiment of the present disclosure. At step 302, a user approaches wireless dock 104 with information handling system 102. In response to information handling system 102 being within a predetermined proximity of wireless dock 104, the information handling system and the wireless dock may each perform one or more operations to seamlessly transition a network connection of the information handling system from an AP to the wireless dock. For example, at step 304 connection service circuitry 202 may communicate with wireless dock 104 to perform a dock discovery procedure. In an example, the dock discovery procedure may be any suitable procedure to enable information handling system 102 to communicate with wireless dock 104.

At step 306, connection service circuitry 202 may provide wireless dock 104 with details about current infrastructure connections of information handling system 102. In an example, the details may include any suitable information for to enable wireless dock 104 to identify the current infrastructure connections of information handling system 102. At step 308, wireless dock 104 may provide information handling system 102 with connection availability of the wireless dock. In an example, the connection availability may include the infrastructure connections available via wireless dock 104.

At step 310, connection service circuitry 202 may validate connectivity with a desired network. In an example, the validation may be based on any suitable criteria including, but not limited to, determining whether the available connections from wireless dock 104 satisfies a threshold for the current infrastructure connections of information handling system 102. In response to the connectivity being validated, connection service circuitry 202 may suspend open network connections and disconnect from an AP, such as AP 106 of FIG. 1, at step 312.

At step 314, connection service circuitry 202 may initiate a connection to a pre-paired AP radio of wireless dock 104. In an example, this connection may be a direct connection between information handling system 102 and wireless dock 104. At step 316, wireless dock 104 may determine whether information handling system 102 is authorized to bridge to a backhaul connection of the wireless dock. In response to the information handling system 102 being authorized, wireless dock 104 may bridge a network connection of the information handling system to network services infrastructure connection of wireless dock 104 via the backhaul connection of the wireless dock at step 318.

At step 320, connection service circuitry 202 may acquire an infrastructure network address via the backhaul connection and may open the suspended network connections directed through the backhaul connection of wireless dock 104. At step 322, information handling system 102 may be connected to a network infrastructure via an infrastructure connection of wireless dock 104.

Figure 4:
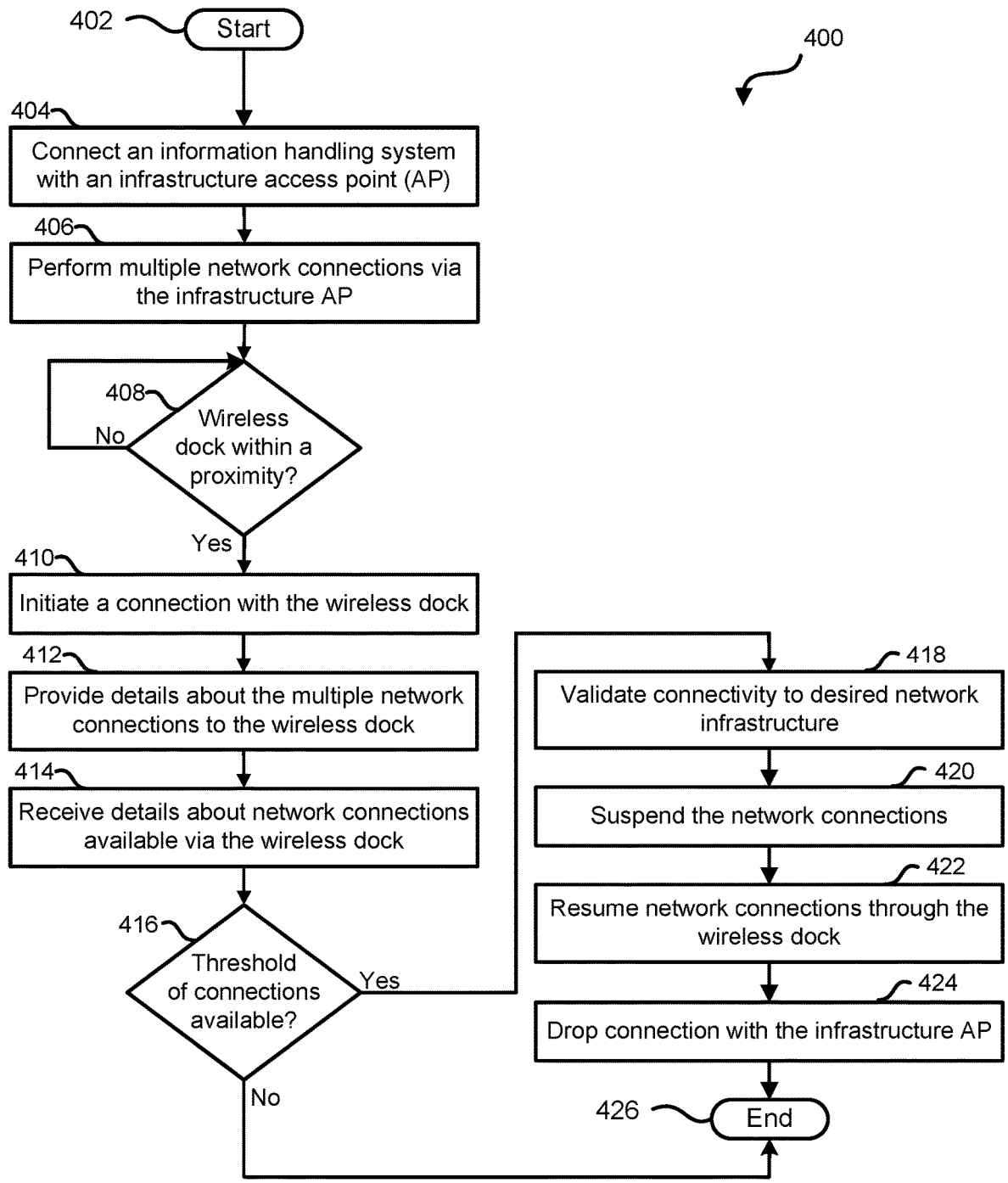
FIG. 4 is a flow diagram of a method for seamlessly transitioning a network connection via a wireless dock according to at least one embodiment of the present disclosure.

FIG. 4 is a flow diagram of a method 400 for seamlessly transitioning a network connection via a wireless dock according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 102 or wireless dock 104 depicted in FIG. 1 or any other type of system, controller, device, module, processor, or any combination thereof, operable to employ all, or portions of, the method of FIG. 4.

At block 404, an information handling system is connected with an infrastructure AP. At block 406, multiple network connections are performed via the infrastructure AP. In an example, the network connections may be any suitable connection including, but not limited to, threads executed by a processor of the information handling system. At block 408, a determination is made whether a wireless dock is within a predetermined proximity. In an example, the predetermined proximity may be any suitable distance including, but not limited to, a distance that is shorter than a current distance between the information handling system the infrastructure AP.

In response to the wireless dock being within the predetermined proximity to the information handling system, a connection is initiated between the information handling system and the wireless dock at block 410. In an example, the connection may be performed by one or more suitable operations including, but not limited to, a wireless dock discovery procedure. At block 412, details about the multiple network connections are provided to the wireless dock. At block 414, details about the network connections available via the wireless dock are received.

At block 416, a determination is made whether the network connections available via the wireless dock satisfies a threshold of connections of the current network connections of the information handling system. In an example, the threshold may be any suitable threshold including, but not limited to, a percentage of connections available, and a total number of connections available. If the threshold of connections is not satisfied, the flow ends at block 426. Otherwise, in response to the connections available via wireless dock satisfying the threshold, connectivity to a desired network infrastructure is validated at block 418. In an example, the connectivity to the desired network infrastructure may be through a backhaul connection of the wireless dock.

At block 420, the current network connections of the information handling system are suspended. At block 422, the network connections are resumed through the wireless dock. In an example, only the network connections available through the wireless dock are resumed, and the other network connections are dropped. At block 424, the connection with the infrastructure AP is dropped, and the method ends at block 426.

Figure 5:
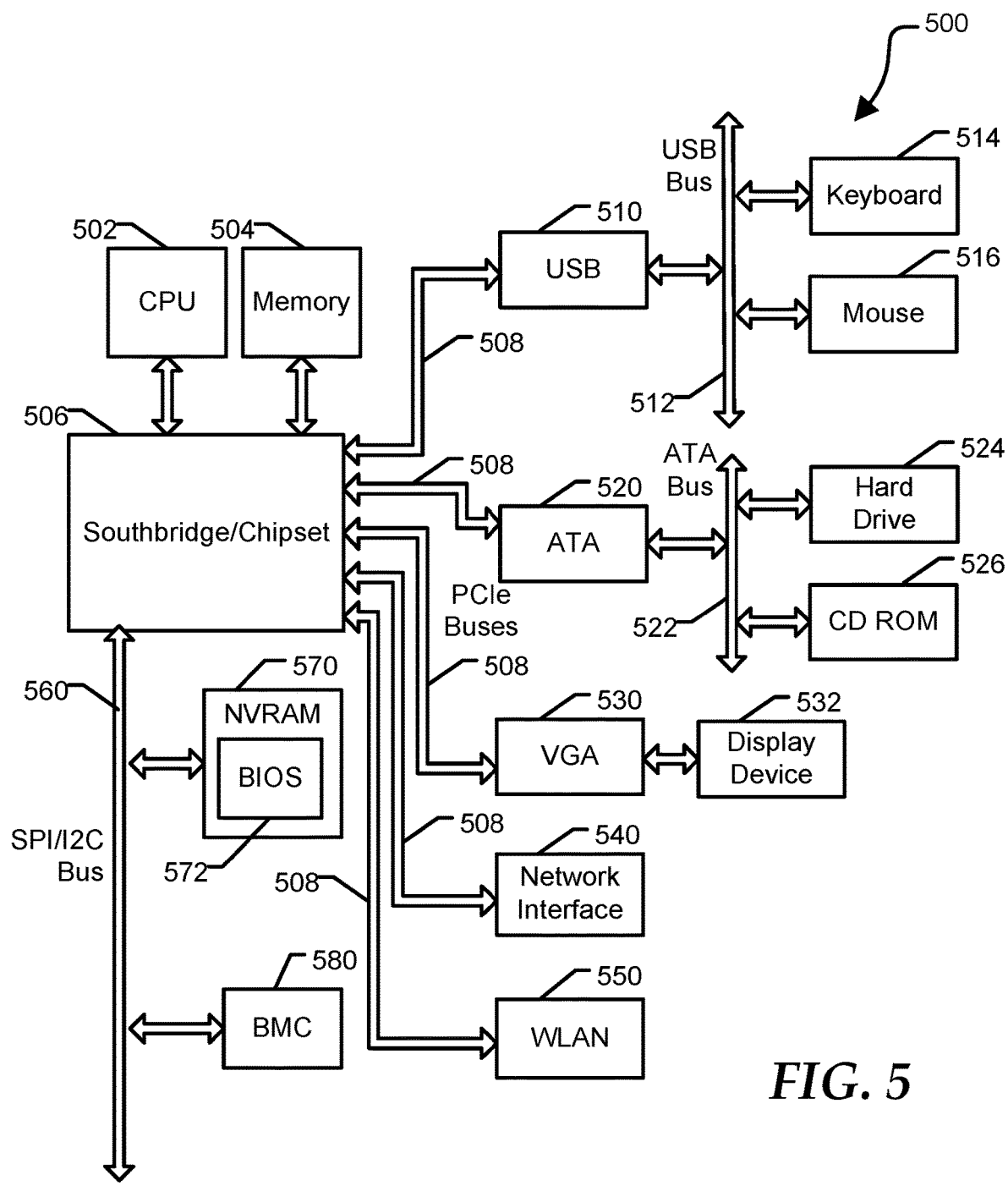
FIG. 5 is a block diagram of a general information handling system according to an embodiment of the present disclosure.

FIG. 5 illustrates a general information handling system 500 including a processor 502, a memory 504, a southbridge/chipset 506, one or more PCIe buses 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an example, chipset 506 may be directly connected to an individual end point via a PCIe root port within the chipset and a point-to-point topology as shown in FIG. 5. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of southbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a network interface card (NIC) including first and second virtual NICs (vNICs); and
   a processor to communicate with the NIC and to:
   connect with an infrastructure access point (AP) via the first vNIC, wherein a plurality of network connections are formed via the infrastructure AP;
   detect that a wireless dock is within a predetermined proximity;
   in response to the wireless dock being within the predetermined proximity, initiate a connection with the wireless dock via the second vNIC;
   determine whether a threshold number of the network connections formed via the infrastructure AP are available via the wireless dock;
   in response to the threshold number of the network connections being available via the wireless dock, resume one or more of the network connections through the wireless dock via the second vNIC; and
   in response to the one or more of the network connections being resumed through the wireless dock, drop the connection with the infrastructure AP.

2. The information handling system of claim 1, wherein prior to the resumption of the one or more of the network connections through the wireless dock via the second vNIC, the processor to:
   provide, to the wireless dock, details about the network connections formed via the infrastructure AP;
   receive, from the wireless dock, details about network connections available via the wireless dock, wherein the determination of whether the threshold number of network connections is based on the network connections available via the wireless dock; and
   in response to the threshold number of the network connections being available via the wireless dock, validate connectivity to a desired network infrastructure.

3. The information handling system of claim 2, wherein in response to the validation of the connectivity to the desired network infrastructure, the processor to:
   suspend the plurality of network connections formed via the infrastructure AP; and
   disconnect from the desired network infrastructure.

4. The information handling system of claim 2, wherein the network connections available via the wireless dock are from a backhaul connection between the wireless dock and the infrastructure access point.

5. The information handling system of claim 1, wherein prior to the resumption of the one or more of the network connections through the wireless dock via the second vNIC, the processor to:
   acquire, from the wireless dock, an infrastructure network address available through the wireless dock; and
   open the one or more network connections through the wireless dock via the second vNIC.

6. The information handling system of claim 1, wherein the initiation of the connection with the wireless dock via the second vNIC includes the processor to connect with a pre-paired access point of the wireless dock.

7. The information handling system of claim 6, wherein the connection with the pre-paired access point of the wireless dock is a direct connection between the information handling system and the wireless dock.

8. The information handling system of claim 1, wherein the predetermined proximity is a shorter distance than a distance between the information handling system and the infrastructure access point.

9. The information handling system of claim 1, wherein the resumption of the one or more of the network connections through the wireless dock avoids a network timeout of the one or more of the network connections.

10. A method comprising:
connecting, by a processor of an information handling system, with an infrastructure access point (AP) via a first virtual network interface card (vNIC) of a NIC;
forming a plurality of network connections via the infrastructure AP;
detecting whether a wireless dock is within a predetermined proximity;
in response to the wireless dock being within the predetermined proximity, initiating a connection with the wireless dock via a second vNIC of the NIC;
determining whether a threshold number of the network connections formed via the infrastructure AP are available via the wireless dock;
in response to the threshold number of the network connections being available via the wireless dock, resuming one or more of the network connections through the wireless dock via the second vNIC; and
in response to the one or more of the network connections being resumed through the wireless dock, dropping the connection with the infrastructure AP.

11. The method of claim 10, wherein prior to the resuming of the one or more of the network connections through the wireless dock via the second vNIC, the method further comprises:
providing, to the wireless dock, details about the network connections formed via the infrastructure AP;
receiving, from the wireless dock, details about network connections available via the wireless dock, wherein the determination of whether the threshold number of network connections is based on the network connections available via the wireless dock; and
in response to the threshold number of the network connections being available via the wireless dock, validating connectivity to a desired network infrastructure.

12. The method of claim 11, wherein in response to the validating of the connectivity to the desired network infrastructure, the method further comprises:
suspending the plurality of network connections formed via the infrastructure AP; and
disconnecting from the desired network infrastructure.

13. The method of claim 11, wherein the network connections available via the wireless dock are from a backhaul connection between the wireless dock and the infrastructure access point.

14. The method of claim 10, wherein prior to the resuming of the one or more of the network connections through the wireless dock via the second vNIC, the method further comprises:
acquiring, from the wireless dock, an infrastructure network address available through the wireless dock; and
opening the one or more network connections through the wireless dock via the second vNIC.

15. The method of claim 10, further comprising:
avoiding a network timeout of the one or more of the network connections based on the resuming of the one or more of the network connections through the wireless dock.

16. The method of claim 10, wherein the initiating of the connection with the wireless dock via the second vNIC includes:
connecting with a pre-paired access point of the wireless dock.

17. The method of claim 16, wherein the connection with the pre-paired access point of the wireless dock is a direct connection between the information handling system and the wireless dock.

18. A non-transitory computer-readable medium including code that when executed by a processor causes the processor to perform a method, the method comprising:
connecting with an infrastructure access point (AP) via a first virtual network interface card (vNIC) of a NIC of an information handling system;
forming a plurality of network connections via the infrastructure AP;
detecting whether a wireless dock is within a predetermined proximity;
if the wireless dock is within the predetermined proximity, then initiating a connection with the wireless dock via a second vNIC of the NIC;
determining whether a threshold number of the network connections formed via the infrastructure AP are available via the wireless dock;
in response to the threshold number of the network connections being available via the wireless dock, resuming one or more of the network connections through the wireless dock via the second vNIC; and
if the one or more of the network connections is resumed through the wireless dock, then dropping the connection with the infrastructure AP.

19. The non-transitory computer-readable medium of claim 18, wherein prior to the resuming of the one or more of the network connections through the wireless dock via the second vNIC, the method further comprises:
providing, to the wireless dock, details about the network connections formed via the infrastructure AP;
receiving, from the wireless dock, details about network connections available via the wireless dock, wherein the determination of whether the threshold number of network connections is based on the network connections available via the wireless dock; and
in response to the threshold number of the network connections being available via the wireless dock, validating connectivity to a desired network infrastructure.

20. The non-transitory computer-readable medium of claim 18, the initiating of the connection with the wireless dock via the second vNIC includes:
avoiding a network timeout of the one or more of the network connections based on the resuming of the one or more of the network connections through the wireless dock.

* * * * *